(12) United States Patent
Kohli et al.

(10) Patent No.: US 8,914,771 B2
(45) Date of Patent: *Dec. 16, 2014

(54) INDICATING HIERARCHY DIVERSION IN A CLASS DIAGRAM

(71) Applicant: International Business Machines Corporation, Armonk, NY (US)

(72) Inventors: Sandeep Kohli, Bangalore (IN); Sarika Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,296

(22) Filed: Nov. 13, 2012

(65) Prior Publication Data

US 2014/0137076 A1    May 15, 2014

(51) Int. Cl.
*G06F 9/44* (2006.01)

(52) U.S. Cl.
USPC ........... 717/108; 717/106; 717/110; 717/116; 717/113

(58) Field of Classification Search
None
See application file for complete search history.

(56) References Cited

U.S. PATENT DOCUMENTS

| | | | |
|---|---|---|---|
| 5,651,101 A | 7/1997 | Gotoh et al. | |
| 5,699,310 A | 12/1997 | Garloff et al. | |
| 5,802,334 A | 9/1998 | Nickolas et al. | |
| 6,269,475 B1 | 7/2001 | Farrell et al. | |
| 6,415,435 B1 * | 7/2002 | McIntyre | 717/108 |
| 6,480,856 B1 * | 11/2002 | McDonald et al. | 1/1 |
| 6,928,453 B2 | 8/2005 | Roddy | |
| 6,993,759 B2 | 1/2006 | Aptus et al. | |
| 7,051,316 B2 | 5/2006 | Charisius et al. | |
| 7,370,315 B1 | 5/2008 | Lovell et al. | |
| 7,779,384 B2 | 8/2010 | Lin et al. | |
| 7,814,427 B2 | 10/2010 | Cook et al. | |
| 7,934,192 B2 | 4/2011 | Shaw | |
| 8,065,655 B1 | 11/2011 | Deo et al. | |
| 2002/0116702 A1 | 8/2002 | Aptus et al. | |
| 2002/0188514 A1 | 12/2002 | Kritt et al. | |
| 2004/0098406 A1 | 5/2004 | Roddy | |
| 2004/0117765 A1 * | 6/2004 | Chan | 717/117 |

(Continued)

FOREIGN PATENT DOCUMENTS

WO    2008096632 A1    8/2008

OTHER PUBLICATIONS

Capretz, L.F., "Object-Oriented Design Methodologies for Software Systems," [online] Ph.D. Thesis, Newcastle Upon Tyne, British Lending Library DSC stock location No. DX172632, 1 pg.

(Continued)

*Primary Examiner* — Chameli Das
(74) *Attorney, Agent, or Firm* — Cuenot, Forsythe & Kim, LLC

(57) ABSTRACT

Indicating hierarchy diversion in a class diagram. A class inheritance structure for at least one parent class contained in computer program code can be identified to determine a class hierarchy corresponding to the parent class. For at least one child class in the class hierarchy that is a child of the parent class, a parent-child similarity value corresponding to a parent-child diversion of the child class from the parent class can be calculated via a processor. The class diagram can be generated. The class diagram can indicate at least the parent class, the child class and the parent-child similarity value. The class diagram can be presented.

25 Claims, 3 Drawing Sheets

(56) References Cited

U.S. PATENT DOCUMENTS

| | | | | |
|---|---|---|---|---|
| 2005/0278362 | A1* | 12/2005 | Maren et al. | 707/100 |
| 2006/0036656 | A1* | 2/2006 | Mercer | 707/203 |
| 2006/0106762 | A1 | 5/2006 | Caracas et al. | |
| 2006/0150169 | A1 | 7/2006 | Cook et al. | |
| 2008/0092109 | A1* | 4/2008 | Kinnucan et al. | 717/105 |
| 2008/0275919 | A1 | 11/2008 | Murthy et al. | |
| 2009/0132996 | A1* | 5/2009 | Eldridge et al. | 717/108 |
| 2009/0157711 | A1* | 6/2009 | Baer et al. | 707/101 |
| 2009/0222473 | A1 | 9/2009 | Chowdhury | |
| 2009/0235229 | A1 | 9/2009 | Dangeville et al. | |
| 2010/0023922 | A1 | 1/2010 | Limburn et al. | |
| 2010/0037203 | A1 | 2/2010 | Limburn | |
| 2010/0070949 | A1 | 3/2010 | Rama et al. | |
| 2010/0185683 | A1 | 7/2010 | Baby et al. | |
| 2010/0198612 | A1* | 8/2010 | Streepy, Jr. | 705/2 |
| 2010/0222902 | A1* | 9/2010 | Eldridge et al. | 700/87 |
| 2011/0029951 | A1 | 2/2011 | Jansen et al. | |
| 2011/0138361 | A1 | 6/2011 | McEntee et al. | |
| 2012/0005644 | A1 | 1/2012 | Limburn et al. | |
| 2012/0102543 | A1 | 4/2012 | Kohli et al. | |
| 2013/0097582 | A1 | 4/2013 | Chandra et al. | |
| 2014/0075004 | A1* | 3/2014 | Van Dusen et al. | 709/223 |
| 2014/0137081 | A1 | 5/2014 | Kohli et al. | |

OTHER PUBLICATIONS

Chao, L. et al., "Reversed Automatic Generation of Visualized Class Diagram of Object-Oriented Program," Journal of Beijing Univ. of Aeronautics and Astronautics, vol. 24, No. 4, pp. 411-414, Abstract Only, Aug. 1998.

Chao, L. et al., "Reversed Automatic Generation of Visualized Class Diagrm of Object-Oriented Program," Journal of Beijing University of Aeronautics and Astronautics, vol. 24, No. 4, pp. 411-413, Aug. 1998 [retrieved Apr. 30, 2013] retrieved from the Internet: <http://www.stmopen.net/reversed-automatic-generation-of-visualized-class-diagram-of-object-oriented-program/> 1 pg.

Capretz, L.F., "Object-Oriented Design Methodologies for Software Systems," Ph.D. Thesis, Newcastle Upon Tyne, British Lending Library DSC stock location No. DX172632, 1991 [retrieved Apr. 30, 2013] retrieved from the Internet: <http://eprint.ncl.ac.uk/pub_details2.aspx?pub_id=161223>, 1 pg.

U.S. Appl. No. 13/276,085, Non-Final Office Action, Dec. 16, 2013, 17 Pg.

Wang, X.B. et al., "Automatic Hierarchical Layout Algorithm for UML Class Diagram," Journal of Software, vol. 20, No. 6, Jun. 2009, pp. 1487-1498, © Institute of Software, the Chinese Academy of Sciences, retrieved from the Internet: <http://pub.chinasciencejournal.com/article/getArticle.action?articleId=7530>.

Krishnan, H. et al., "Relative Extraction Methodology for class diagram generation using dependency graph," [Online] 2010 IEEE Int'l. Conf. on Communication Control and Computing Technologies (ICCCCT), Oct. 7-9, 2010, pp. 815-820, retrieved from the Internet: <http://ieeexplore.ieee.org/stamp/stamp.jsp?arnumber=5670730>.

Patwardhan, A.A. et al., "Security-aware program visualization for analyzing in-lined reference monitors," Master's Thesis, Univ. of Texas at Dallas, Jun. 2010, 71 pgs.

U.S. Appl. No. 13/276,085, Final Office Action, May 8, 2014, 16 pg.

U.S. Appl. No. 13/276,085, Adviosry Action, May 8, 2014, 16 pg.

U.S. Appl. No. 14/025,007, Non-final Office Action, Mar. 20, 2014, 12 pg.

* cited by examiner

INDICATING HIERARCHY DIVERSION IN A CLASS DIAGRAM

BACKGROUND

Arrangements described herein relate to the Unified Modeling Language (UML) and, more particularly, class diagrams.

UML is a standardized general-purpose modeling language used in the development of object-oriented software. UML includes a set of graphic notation techniques to create visual models of object-oriented software systems. For a particular system, UML is used to generate a UML model and a set of UML diagrams of the system. The UML diagrams typically include a static view, which emphasizes the static structure of the system using objects, attributes, operations and relationships, and a dynamic view, which emphasizes the dynamic behavior of the system by showing collaborations among objects and changes to the internal states of the objects. The static view includes class diagrams and composite structure diagrams. Class diagrams, in particular, show the classes of a system, their interrelationships (including inheritance, aggregation, and association), and the operations and attributes of the classes. Class diagrams help software developers to understand the way the inheritance is implemented in the program code of a software system.

BRIEF SUMMARY

One or more embodiments disclosed within this specification relate to indicating hierarchy diversion in a class diagram.

An embodiment can include a system having a processor. The processor can be configured to initiate executable operations including identifying a class inheritance structure for at least one parent class contained in computer program code to determine a class hierarchy corresponding to the parent class. For at least one child class in the class hierarchy that is a child of the parent class, a parent-child similarity value corresponding to a parent-child diversion of the child class from the parent class can be calculated. The class diagram can be generated. The class diagram can indicate at least the parent class, the child class and the parent-child similarity value. The class diagram can be presented.

Another embodiment can include a computer program product for hierarchy diversion in a class diagram. The computer program product can include a computer-readable storage medium having stored thereon program code that, when executed, configures a processor to perform operations including identifying, by the processor, a class inheritance structure for at least one parent class contained in computer program code to determine a class hierarchy corresponding to the parent class. The operations further can include, for at least one child class in the class hierarchy that is a child of the parent class, calculating, by the processor, a parent-child similarity value corresponding to a parent-child diversion of the child class from the parent class. The operations also can include generating, by the processor, the class diagram, the class diagram indicating at least the parent class, the child class and the parent-child similarity value. The operations also can include presenting, by the processor, the class diagram.

DETAILED DESCRIPTION

Figure 1:
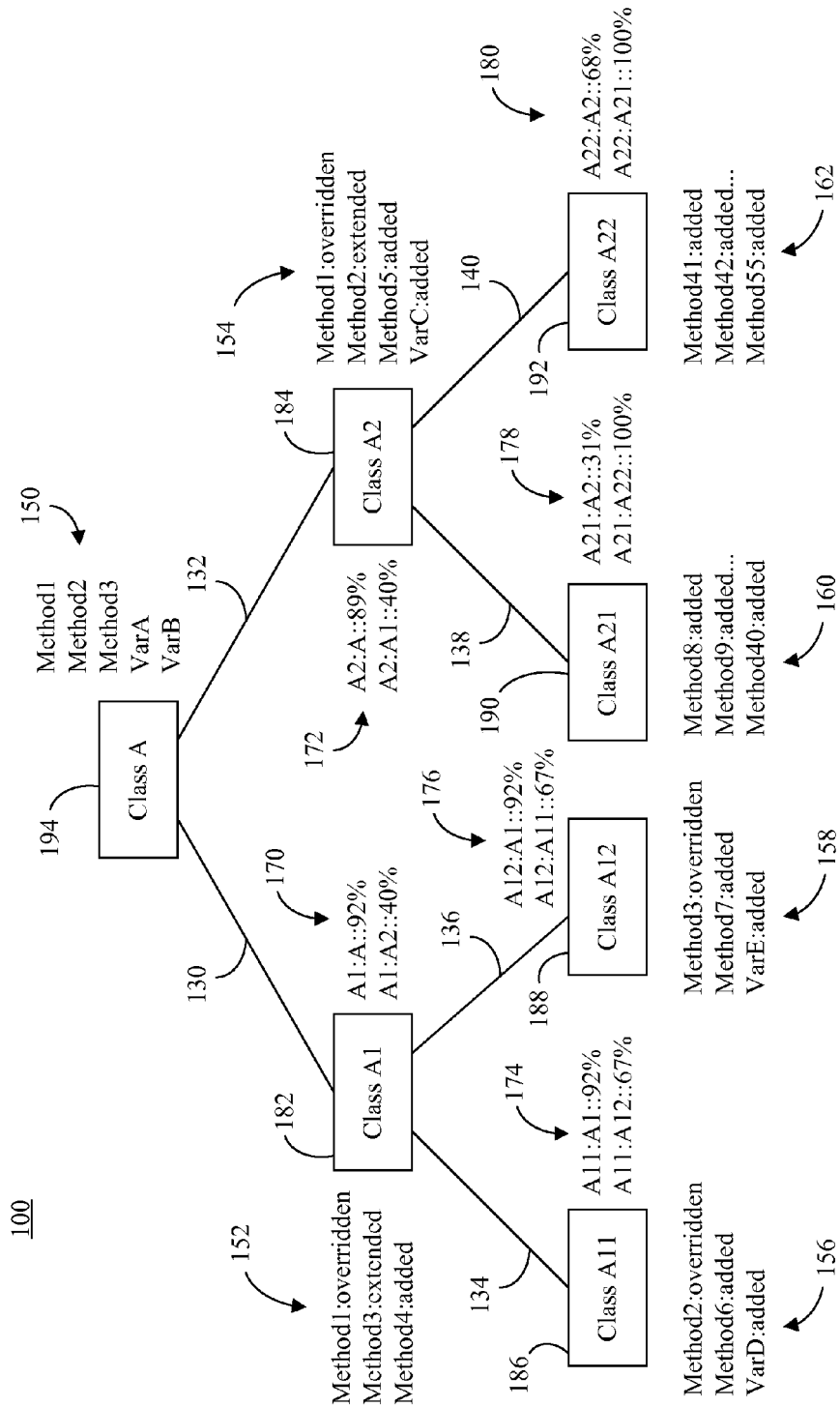
FIG. 1 is a block diagram depicting an example of a class diagram that indicates hierarchy diversion in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to indicating hierarchy diversion in a class diagram. Specifically, a user can select a class contained in computer program code to be presented in the class diagram. In response, a class inheritance structure can be identified in the program code, and a class diagram can be generated which indicates the class hierarchy. Specifically, the class diagram can indicate the selected class, which with respect the class hierarchy is a parent class, and one or more child classes related to the parent class. For at least one of the child classes, a parent-child similarity value can be generated that corresponds to a parent-child diversion of the child class with its parent class. This parent-child similarity value can be indicated in the class diagram.

As used herein, the term "parent-child similarity value" means a value that indicates a level of similarity between a child class and a parent class based on a comparison of functions (e.g., methods) and/or variables contained in the child class to functions and/or variables contained in the parent class. As used herein, the term "class" means a computer program construct that is used to create one or more instances of itself. As used herein, the term "user" means a person (i.e., human being). As used herein, the term function encompasses methods, routines, subroutines or procedures associated with a class.

FIG. 1 is a block diagram depicting an example of a class diagram 100 that indicates hierarchy diversion in accordance with one embodiment disclosed within this specification. The class diagram 100 can be generated when a user selects a class, such as "Class A" contained in program code to be presented in the class diagram. The class diagram 100 can present the Class A and children of Class A, such as Class A1 and Class A2. The class diagram 100 also can present children of Class A1 and Class A2, such as Class A11 and Class A12, and Class A21 and Class A22, respectively. The class diagram further can present children of Classes A11-A22, and children of such classes, etc. The relationships between the classes A, A1, A2, A11, A12, A2, A22 can be depicted in the class diagram 100 in any suitable manner, for example using lines 130, 132, 134, 136, 138, 140 or other suitable indicators.

The computer program code can be processed to calculate, via a processor, respective parent-child similarity values corresponding to parent-child diversions of child classes from their parent classes, and these parent-child similarity values can be presented in the class diagram 100. Moreover, sibling child classes can be identified. For at least one pair of sibling child classes in the class hierarchy, a sibling similarity value corresponding to a similarity of the sibling child classes can be calculated and indicated in the class diagram 100.

Continuing with the present example, assume Class A includes one or more functions and one or more variables. In this example, the functions can be methods, which are subroutines or procedures associated with Class A. The class diagram 100 can indicate such functions and variables in a text box 150 (e.g., Method1, Method2, Method3, VarA and VarB) associated with Class A. The class diagram 100 also can indicate functions and variables of Class A which are passed to the children of Class A, for example Class A1 and Class A2, and the changes and/or additions to the functions/variables implemented by the classes A1 and A2. In illustration, the class diagram 100 can indicate a text box 152 associated with the Class A1, and a test box 154 associated with the Class A2.

The text box 152 can indicate changes to the functions and/or variables of Class A as implemented by Classes A1 and A2. By way of example, a text box 152 associated with Class A1 can indicate the Method1 is overridden, the Method3 is extended, a Method4 has been added, etc. with respect to Class A1. Similarly, a text box 154 associated with Class A2 can indicate changes to the functions and/or variables of Class A as implemented by Class A2. By way of example, the text box 154 can indicate the Method1 is overridden, the Method2 is extended, a Method5 is added, and a Variable (VarC) is added.

Changes to the functions and/or variables of Class A1 as implemented by Classes A11 and A12 can be indicated in respective text boxes 156, 158, for example as previously described. Similarly changes to the functions and/or variables of Class A2 as implemented by Classes A21 and A22 can be indicated in respective text boxes 160, 162, for example as previously described.

In addition to, or in lieu of the test boxes 152-162, the class diagram 100 can indicate at least one parent-child similarity value between at least one parent class and at least one child class presented in the class diagram 100. For example, the class diagram 100 can include text boxes 170, 172, 174, 176, 178 including respective parent-child similarity values for child Classes A1, A2, A11, A12, A21 and A22.

In illustration, a text box 170 can be associated with Class A1 that indicates a parent-child similarity value corresponding to a parent-child diversion of the child Class A1 from its parent Class A, and the text box 170 can be presented in the class diagram 100. Similarly, a text box 172 can be associated with Class A2 that indicates a parent-child similarity value corresponding to a parent-child diversion of the child Class A2 from its parent Class A, and the text box 172 can be presented in the class diagram 100. Likewise, text boxes 174, 176, 178, 180 can be associated with the respective Classes A11, A12, A21, A212 to indicate corresponding parent-child similarity values between the Classes A11, A12, A21, A212 and their respective parent Classes A1, A2.

The parent-child similarity value can be calculated using any suitable algorithm. In one non-limiting example, the parent-child similarity value can be calculated using the following equation:

$$S=((m-m1)+(v-v1))*100/(m+v)$$

where:
S=similarity value (e.g., as a percentage)
m=total number of functions (e.g. methods) in a parent class
m1=a sum of function diversion weights based on differences between a child class and the parent class
v=a total number of variables in the parent class
v1=a sum of variable diversion weights based on differences between the child class and the parent class Examples of the function diversion weights are provided in Table 1:

TABLE 1

| | |
|---|---|
| Function added in child class: | 0.15 |
| Function extended in child class: | 0.5 |
| Function overridden: | 0.20 |
| Function deleted: | 0.10 |
| Abstract function implemented: | 0.5 |

An abstract function is a function that is declared in a parent class without being implemented in the parent class, as is known to those skilled in the art. Examples of the variable diversion weights are provided in Table 2:

TABLE 2

| | |
|---|---|
| Variable added in child case: | 0.15 |
| Variable hidden in child case: | 0.5 |
| Variable type changed in child case: | 0.10 |
| Variable initialization modified in child case: | 0.5 |

In one arrangement, the parent-child similarity value can be equal to the similarity value S (e.g., as a percentage of similarity). In another arrangement, the parent-child similarity value can be equal to 1−S, in which case the parent-child similarity value can represent a divergence value (e.g., as a percentage of divergence). Regardless of whether the parent-child similarity value is represented by a similarity value or a divergence value, since the similarity value and divergence value directly correlate to one another, both are examples of the parent-child similarity value and represent the hierarchy diversion in the class diagram 100.

By way of example, referring to Class A and Class A1, there are three (3) methods and two (2) variables defined in Class A. In comparison to Class A, in Class A1, Method1 is overridden, Method3 is extended, and Method4 is added. There are no changes to the variables. Hence, the similarity value S can be computed as ((3−(0.15+0.5+0.2))+(2−0)) *100/(3+2)=92%. In the case that the parent-child similarity value is equal to S, the parent-child similarity value is equal to 92%. In the case that the parent-child similarity value is equal to 1−S, the parent-child similarity value is equal to 8%. The parent-child similarity value can be indicated in the text box 170.

In some instances, the computed value of S may be negative (i.e., less than zero). In such cases, the value of S can be rounded up to be zero.

In addition to, or in lieu of percentage values, the parent-child similarity value for each child Class A1, A2, A11, A12, A21, A22 can be computed as a standard deviation value based on the respective similarity values. In illustration, the respective similarity values can be determined for each Class A1, A2, A11, A12, A21, A22, and based on the total of these similarity values, respective standard deviation values for each Class A1, A2, A11, A12, A21, A22 can be computed and assigned to the respective Classes A1, A2, A11, A12, A21, A22 as the parent-child similarity values.

Further, in one arrangement, a level of divergence of the child classes A1, A2, A11, A12, A21, A22 from their respective parent classes A, A1, A2 can be indicated by representing the child classes A1, A2, A11, A12, A21, A22 in the class diagram 100 with color or highlighting applied to the respective nodes 182, 184, 186, 188, 190, 192 representing the child classes A1, A2, A11, A12, A21, A22. Color or highlighting also can be applied to the node 194 representing the parent class A, though this is not a requirement. In illustration, lighter colors or highlighting can be applied to nodes 182, 184, 186, 188, 190, 192 representing the child classes A1, A2, A11, A12, A21, A22 with relatively low levels of divergence from (or high similarity to) their parent classes A, A1, A2, medium colors or highlighting can be applied to nodes 182, 184, 186, 188, 190, 192 representing the child classes A1, A2, A11, A12, A21, A22 with relatively moderate levels of divergence from (or similarity to) their parent classes A, A1, A2, and darker colors or highlighting can be applied to nodes 182, 184, 186, 188, 190, 192 representing the child classes A1, A2, A11, A12, A21, A22 with relatively high levels of divergence from (or low similarity to) their parent classes A, A1, A2.

In addition to, or in lieu of, determining the parent-child similarity value, a sibling similarity value can be determined for one or more siblings in the class diagram 100. As used herein, siblings in the class diagram 100 are classes which depend directly from a common class and are at the same class hierarchy level. In illustration, the Classes A11 and A12 both directly depend from the Class A1, and are at the same hierarchy level. Thus, the Classes A11 and A12 can be considered to be sibling classes. Similarly, Classes A21 and A22 both directly depend from the Class A2, and are at the same hierarchy level. Thus, the Classes A21 and A22 can be considered to be sibling classes. Accordingly, the text boxes 170-178 can indicate respective sibling similarity values.

To determine the sibling similarity value between sibling classes, a determination can be made as to the total number of functions and variables provided by the parent class, and the total number of functions and variables from the parent class that are common to the sibling classes. By way of example, referring to sibling Classes A11 and A12, from Class A1, Method1, Method 4, VarA and VarB are not changed in the sibling Classes A11 and A12. Further, Class A1 includes Method1, Method2, Method3, Method 4, VarA and VarB. Hence, a similarity value (S) between sibling classes can be computed as (4/6)*100=67%. The sibling similarity value can be S (e.g., 67%), or 1−S (e.g., 33%). The sibling similarity value can be identified in the text box 174 and/or the text box 176.

In one arrangement, since the sibling similarity value for the Class A11 and the Class A12 is the same, the sibling similarity value need only be presented in the text box 174 or the text box 176, but not both. Nonetheless, the sibling similarity value can be included in both text boxes 174, 176 and the present arrangements are not limited in this regard.

In one arrangement, highlighting or colors can be applied to nodes 182, 184, 186, 188, 190, 192 representing the child classes A1, A2, A11, A12, A21, A22 to indicate the divergence and/or similarity between sibling child classes A1, A2, A11, A12, A21, A22. Such highlighting or colors can be selected in a manner similar to that previously described.

Figure 2:
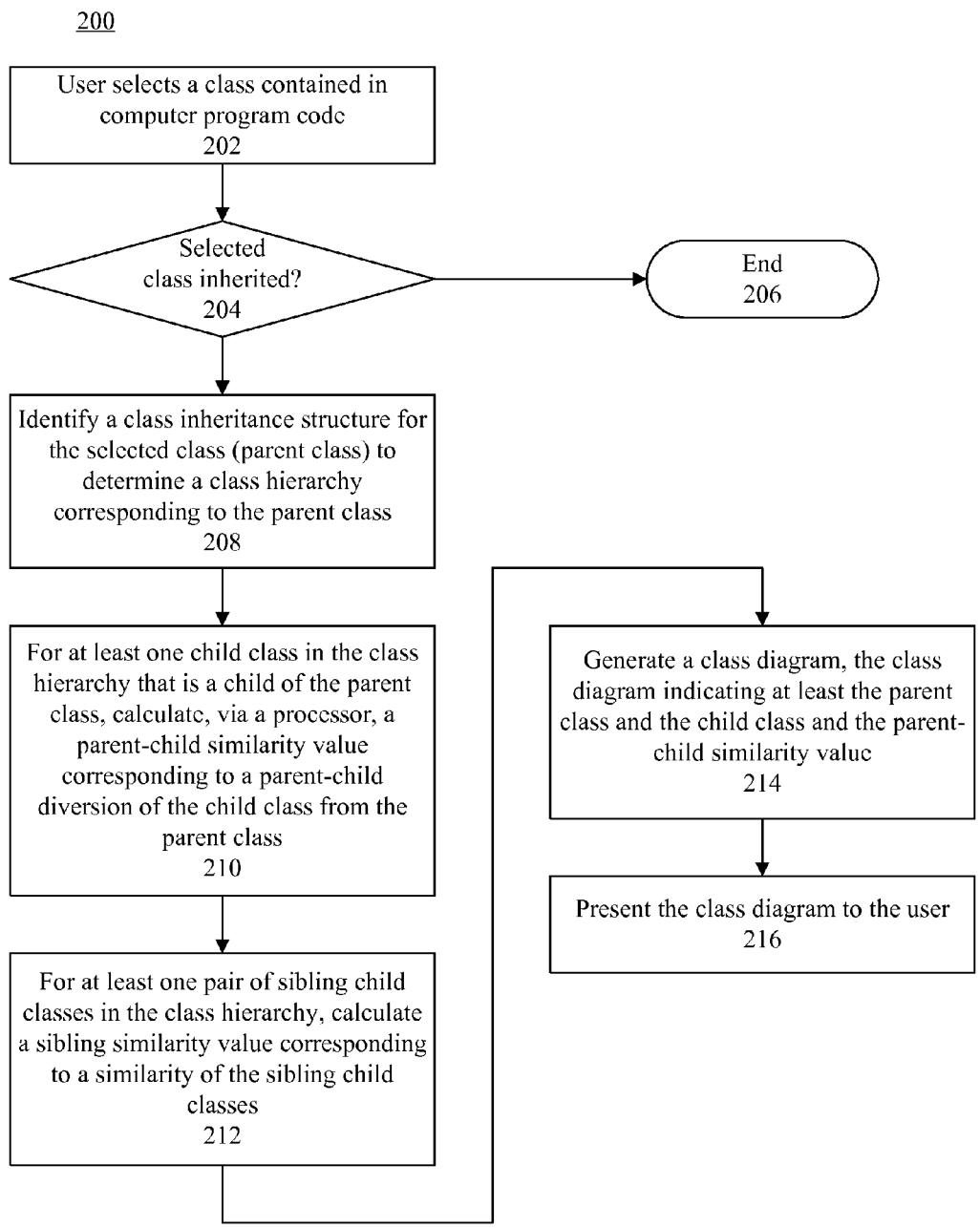
FIG. 2 is a flow chart illustrating a method of indicating hierarchy diversion in a class diagram in accordance with an embodiment disclosed within this specification.

FIG. 2 is a flow chart illustrating a method 200 of indicating hierarchy diversion in a class diagram in accordance with an embodiment disclosed within this specification. At step 202, a user can select a class contained in computer program code. For example, via a graphical user interface (GUI) the user can view the computer program code or a flow diagram representing the computer program code, and select the class directly from the computer program code or the flow diagram. At decision box 204, a determination can be made as to whether the selected class is inherited (e.g., by one or more other classes in the computer program code). If not, the process can proceed to step 206 and end. If the selected class is inherited, the selected class can be identified as a parent class. At step 208 a class inheritance structure for the parent class can be identified to determine a class hierarchy corresponding to the parent class.

At step 210, for at least one child class in the class hierarchy that is a child of the parent class, via a processor, a parent-child similarity value can be calculated. The parent-child similarity value can correspond to a parent-child diversion of the child class from the parent class. Any of a myriad of parameters can be evaluated to determine the parent-child similarity value. Such parameters can include, but are not limited to, a number of functions contained the child class that are not contained in the parent class, a number of functions contained the child class that extend functions contained in the parent class, a number of functions contained the child class that override corresponding functions contained in the parent class, a number of functions contained the parent class that are not contained in the child class, a number of abstract functions implemented in the parent class, a number of variables contained the child class that are not contained in the parent class, a number of variables contained the parent class that are not processed in the child class, a number of variables contained the child class whose type is changed in the child class from a type indicated in the parent class, a number of variables contained the child class whose initialization is modified in comparison to the parent class and/or the like.

Optionally, at least one pair of sibling child classes in the class hierarchy can be identified. At step 212, for the at least one pair of sibling child classes in the class hierarchy, a sibling similarity value corresponding to a similarity of the sibling child classes can be calculated.

At step 214, a class diagram can be generated. The class diagram can indicate the parent class and one or more child classes. In this regard, one or more children of the parent class may themselves be parents to additional child classes, and such additional child classes can be included in the class diagram. The class diagram further can indicate the parent-child similarity value(s). In an arrangement in which the sibling similarity values corresponding to the similarity of the sibling child classes is calculated, the class diagram further can indicate the sibling similarity values. The class diagram also can indicate the differences between functions and/or variables of the child class(es) and functions and/or variables of the parent class(es). At step 216, the class diagram can be presented to the user.

Figure 3:
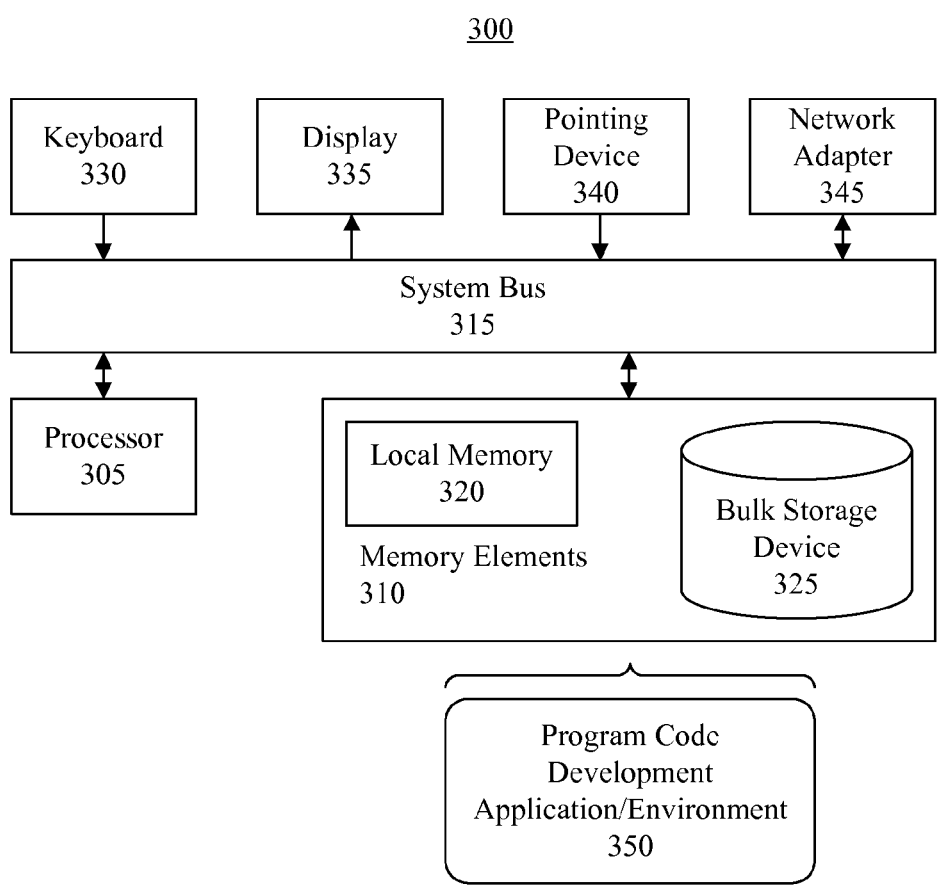
FIG. 3 is a block diagram illustrating a system for indicating hierarchy diversion in a class diagram in accordance with an embodiment disclosed within this specification.

FIG. 3 is a block diagram illustrating a processing system 300 for indicating hierarchy diversion in a class diagram in accordance with an embodiment disclosed within this specification. The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a keyboard 330, a display 335, a pointing device 340 and, optionally, a network adapter 345 can be coupled to the processing system 300. The I/O devices can be coupled to the processing system 300 either directly or through intervening I/O controllers. For example, the display 335 can be coupled to the processing system 300 via a graphics processing unit (GPU), which may be a component of the processor 305 or a discrete device. The network adapters 345 can enable processing system 300 to become coupled to other systems, computer systems, remote printers, and/or remote storage devices through intervening private or public networks. Modems, cable modems, and Ethernet cards are examples of different types of network adapters 345 that can be used with processing system 300.

As pictured in FIG. 3, the memory elements 310 can store a program code development application/environment 350 that performs the methods/processes described herein, for example to generate the class diagram 100 of FIG. 1 and to implement the method 200 described in FIG. 2. Being implemented in the form of executable program code, the program code development application/environment 350 can be executed by the processing system 300 and, as such, can be considered part of the processing system 300. Moreover, the program code development application/environment 350 comprises functional data structures that impart functionality described herein when employed as part of the processing system of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor configured to initiate executable operations comprising:
identifying a class inheritance structure for at least one parent class contained in computer program code to determine a class hierarchy corresponding to the parent class;
for at least one child class in the class hierarchy that is a child of the parent class, calculating a parent-child similarity value corresponding to a parent-child diversion of the child class from the parent class, the parent-child similarity value comprising at least one numeral;
based on the parent-child similarity value corresponding to the parent-child diversion of the child class from the parent class and parent-child similarity values of other children of the parent class, determining standard deviation for the parent-child similarity value corresponding to the parent-child diversion of the child class from the parent class;
generating, by the processor, the class diagram, the class diagram indicating at least the parent class, the child class, the parent-child similarity value, and the standard deviation; and
presenting the class diagram.

2. The system of claim 1, wherein calculating the parent-child similarity value corresponding to a parent-child similarity of the child class from its parent class comprises:
determining a number of functions contained the child class that are not contained in the parent class.

3. The system of claim 1, wherein calculating the parent-child similarity value corresponding to a parent-child similarity of the child class from its parent class comprises:
determining a number of functions contained the child class that extend functions contained in the parent class.

4. The system of claim 1, wherein calculating the parent-child similarity value corresponding to a parent-child similarity of the child class from its parent class comprises:
determining a number of functions contained the child class that override corresponding functions contained in the parent class.

5. The system of claim 1, wherein calculating the parent-child similarity value corresponding to a parent-child similarity of the child class from its parent class comprises:
determining a number of functions contained the parent class that are not contained in the child class.

6. The system of claim 1, wherein calculating the parent-child similarity value corresponding to a parent-child similarity of the child class from its parent class comprises:
determining a number of abstract functions implemented in the parent class.

7. The system of claim 1, wherein calculating the parent-child similarity value corresponding to a parent-child similarity of the child class from its parent class comprises:
determining a number of variables contained the child class that are not contained in the parent class.

8. The system of claim 1, wherein calculating the parent-child similarity value corresponding to a parent-child similarity of the child class from its parent class comprises:
   determining a number of variables contained the parent class that are not processed in the child class.

9. The system of claim 1, wherein calculating the parent-child similarity value corresponding to a parent-child similarity of the child class from its parent class comprises:
   determining a number of variables contained the child class whose type is changed in the child class from a type indicated in the parent class.

10. The system of claim 1, wherein calculating the parent-child similarity value corresponding to a parent-child similarity of the child class from its parent class comprises:
   determining a number of variables contained the child class whose initialization is modified in comparison to the parent class.

11. The system of claim 1, the executable operations further comprising:
   indicating in the class diagram, for each child class, differences between functions of the child class and functions of the parent class.

12. The system of claim 1, the executable operations further comprising:
   for at least one pair of sibling child classes in the class hierarchy, calculating a sibling similarity value corresponding to a similarity of the sibling child classes; and
   indicating in the class diagram the sibling similarity value.

13. A computer program product for indicating hierarchy diversion in a class diagram, the computer program product comprising a computer readable storage device having program code embodied therewith, wherein the computer readable storage device is not a transitory, propagating signal per se, the program code executable by a processor to perform a method comprising:
   identifying, by the processor, a class inheritance structure for at least one parent class contained in computer program code to determine a class hierarchy corresponding to the parent class;
   for at least one child class in the class hierarchy that is a child of the parent class, calculating, by the processor, a parent-child similarity value corresponding to a parent-child diversion of the child class from the parent class, the parent-child similarity value comprising at least one numeral;
   based on the parent-child similarity value corresponding to the parent-child diversion of the child class from the parent class and parent-child similarity values of other children of the parent class, determining standard deviation for the parent-child similarity value corresponding to the parent-child diversion of the child class from the parent class;
   generating, by the processor, the class diagram, the class diagram indicating at least the parent class, the child class, the parent-child similarity value, and the standard deviation; and
   presenting, by the processor, the class diagram.

14. The computer program product of claim 13, wherein calculating the parent-child similarity value corresponding to a parent-child similarity of the child class from its parent class comprises:
   determining a number of functions contained the child class that are not contained in the parent class.

15. The computer program product of claim 13, wherein calculating the parent-child similarity value corresponding to a parent-child similarity of the child class from its parent class comprises:
   determining a number of functions contained the child class that extend functions contained in the parent class.

16. The computer program product of claim 13, wherein calculating the parent-child similarity value corresponding to a parent-child similarity of the child class from its parent class comprises:
   determining a number of functions contained the child class that override corresponding functions contained in the parent class.

17. The computer program product of claim 13, wherein calculating the parent-child similarity value corresponding to a parent-child similarity of the child class from its parent class comprises:
   determining a number of functions contained the parent class that are not contained in the child class.

18. The computer program product of claim 13, wherein calculating the parent-child similarity value corresponding to a parent-child similarity of the child class from its parent class comprises:
   determining a number of abstract functions implemented in the parent class.

19. The computer program product of claim 13, wherein calculating the parent-child similarity value corresponding to a parent-child similarity of the child class from its parent class comprises:
   determining a number of variables contained the child class that are not contained in the parent class.

20. The computer program product of claim 13, wherein calculating the parent-child similarity value corresponding to a parent-child similarity of the child class from its parent class comprises:
   determining a number of variables contained the parent class that are not processed in the child class.

21. The computer program product of claim 13, wherein calculating the parent-child similarity value corresponding to a parent-child similarity of the child class from its parent class comprises:
   determining a number of variables contained the child class whose type is changed in the child class from a type indicated in the parent class.

22. The computer program product of claim 13, wherein calculating the parent-child similarity value corresponding to a parent-child similarity of the child class from its parent class comprises:
   determining a number of variables contained the child class whose initialization is modified in comparison to the parent class.

23. The computer program product of claim 13, the method further comprising:
   indicating in the class diagram, for each child class, differences between functions of the child class and functions of the parent class.

24. The computer program product of claim 13, the method further comprising:
   for at least one pair of sibling child classes in the class hierarchy, calculating a sibling similarity value corresponding to a similarity of the sibling child classes; and
   indicating in the class diagram the sibling similarity value.

25. A computer program product for indicating hierarchy diversion in a class diagram, the computer program product comprising a computer readable storage device having program code embodied therewith, wherein the computer readable storage device is not a transitory, propagating signal per se, the program code executable by a processor to perform a method comprising:

identifying a class inheritance structure for at least one parent class contained in computer program code to determine a class hierarchy corresponding to the parent class;

for at least one pair of sibling child classes in the class hierarchy calculating a sibling similarity value corresponding to a similarity of the sibling child classes, the sibling similarity value comprising at least one numeral;

based on the sibling similarity value, determining standard deviation for the sibling similarity value corresponding to a diversion of the child classes;

generating the class diagram, the class diagram indicating the parent class, the sibling child classes and the sibling similarity value; and presenting the class diagram.

* * * * *